May 17, 1966  H. PECHTHOLD  3,251,915
METHOD AND APPARATUS FOR MANUFACTURING CLOSED CONTAINERS
FILED WITH FLOWABLE GOODS
Filed Oct. 24, 1962  5 Sheets-Sheet 2
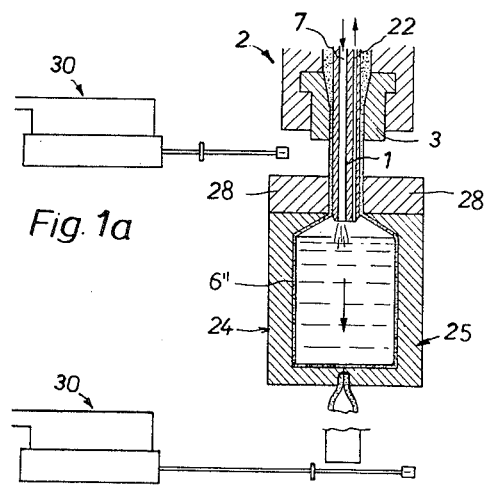
*Fig. 1a*
*Fig. 1b*
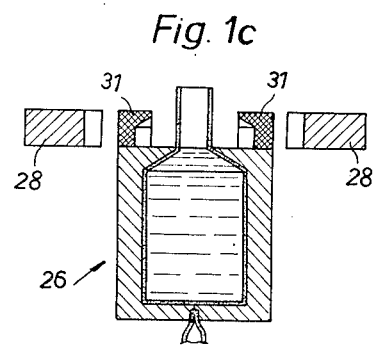
*Fig. 1c*
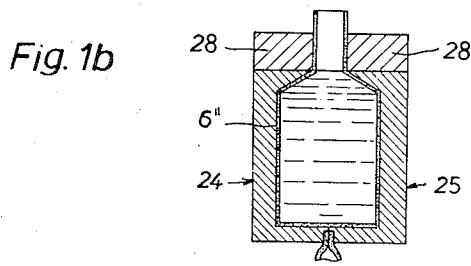
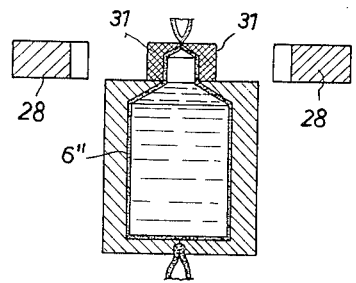
*Fig. 1d*
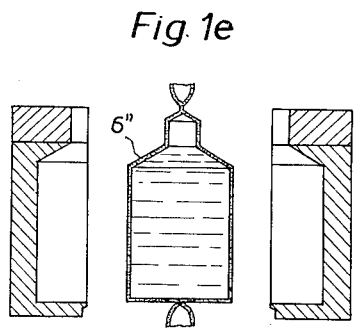
*Fig. 1e*

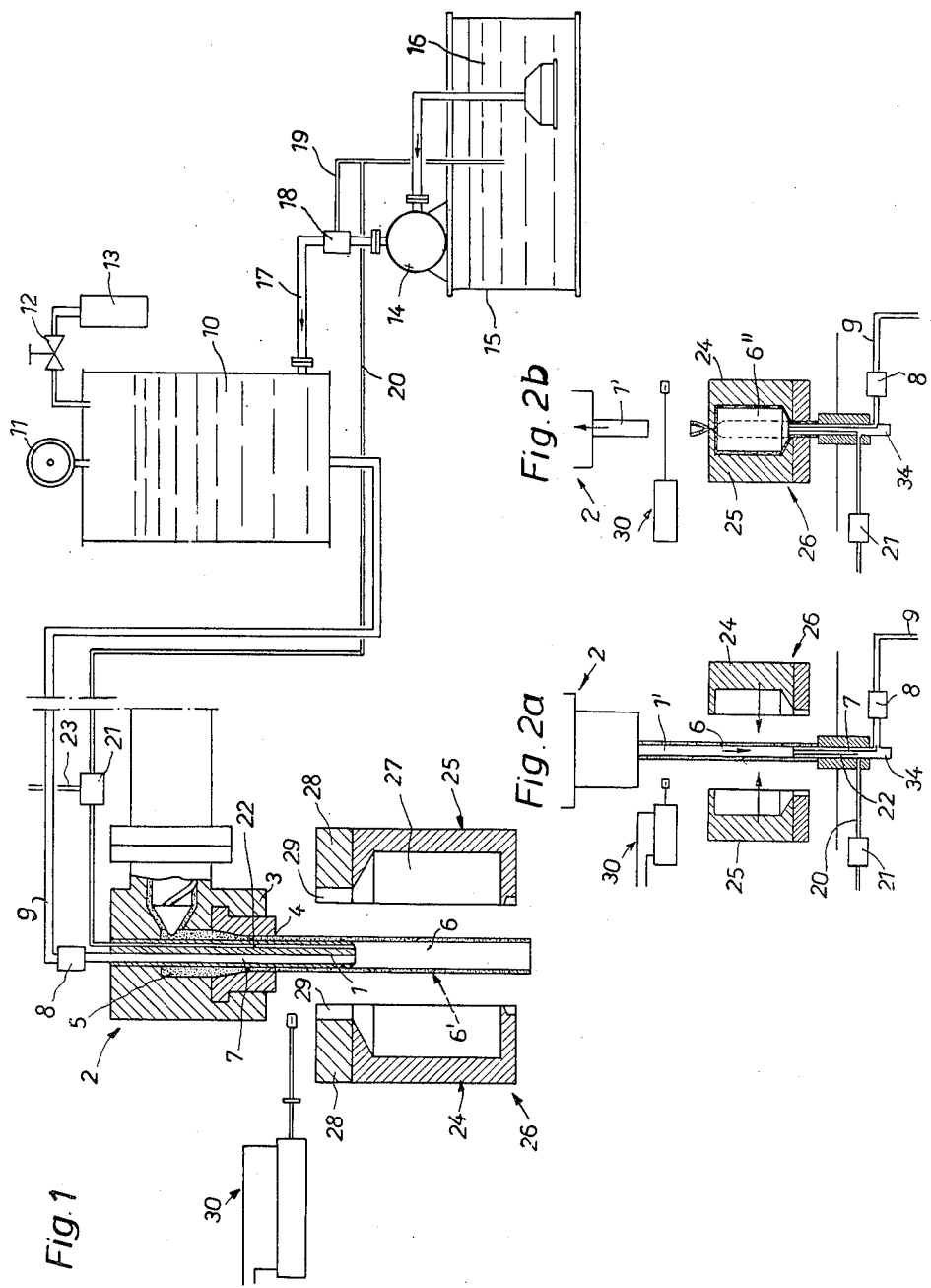

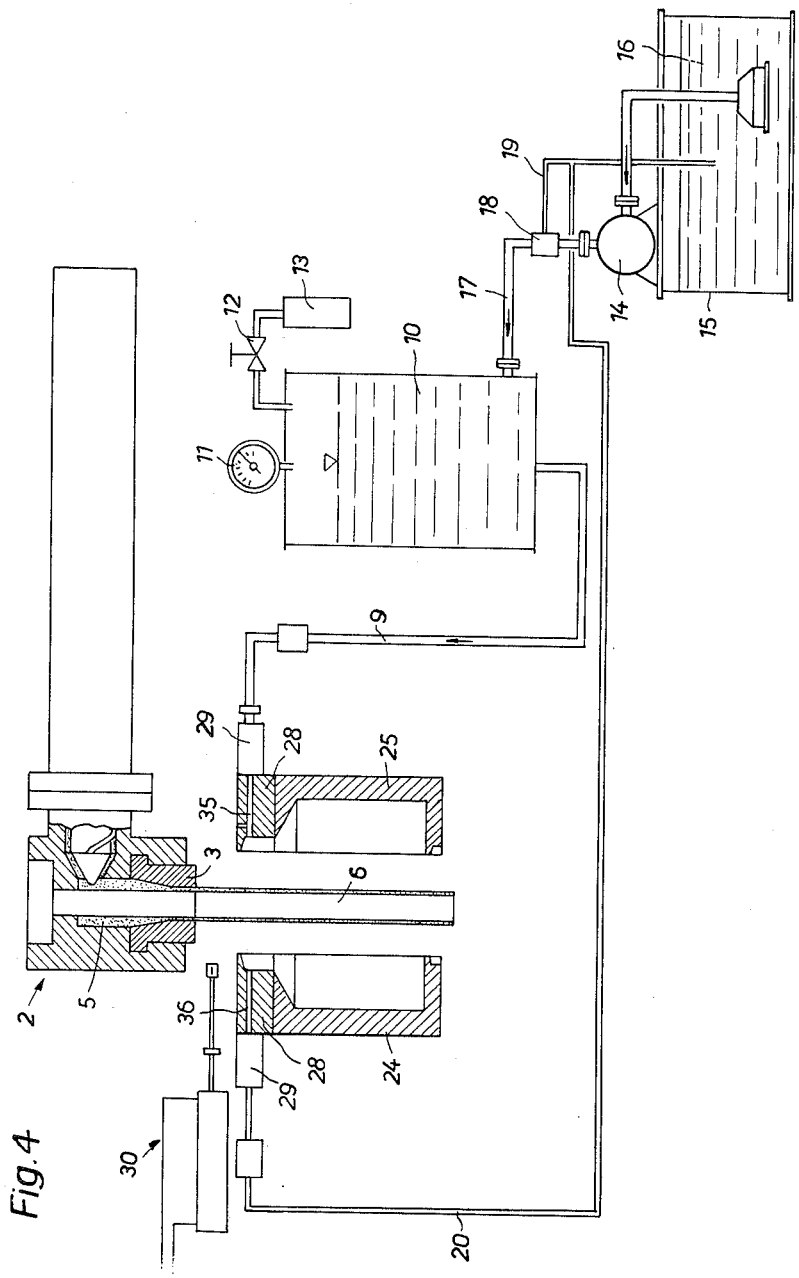

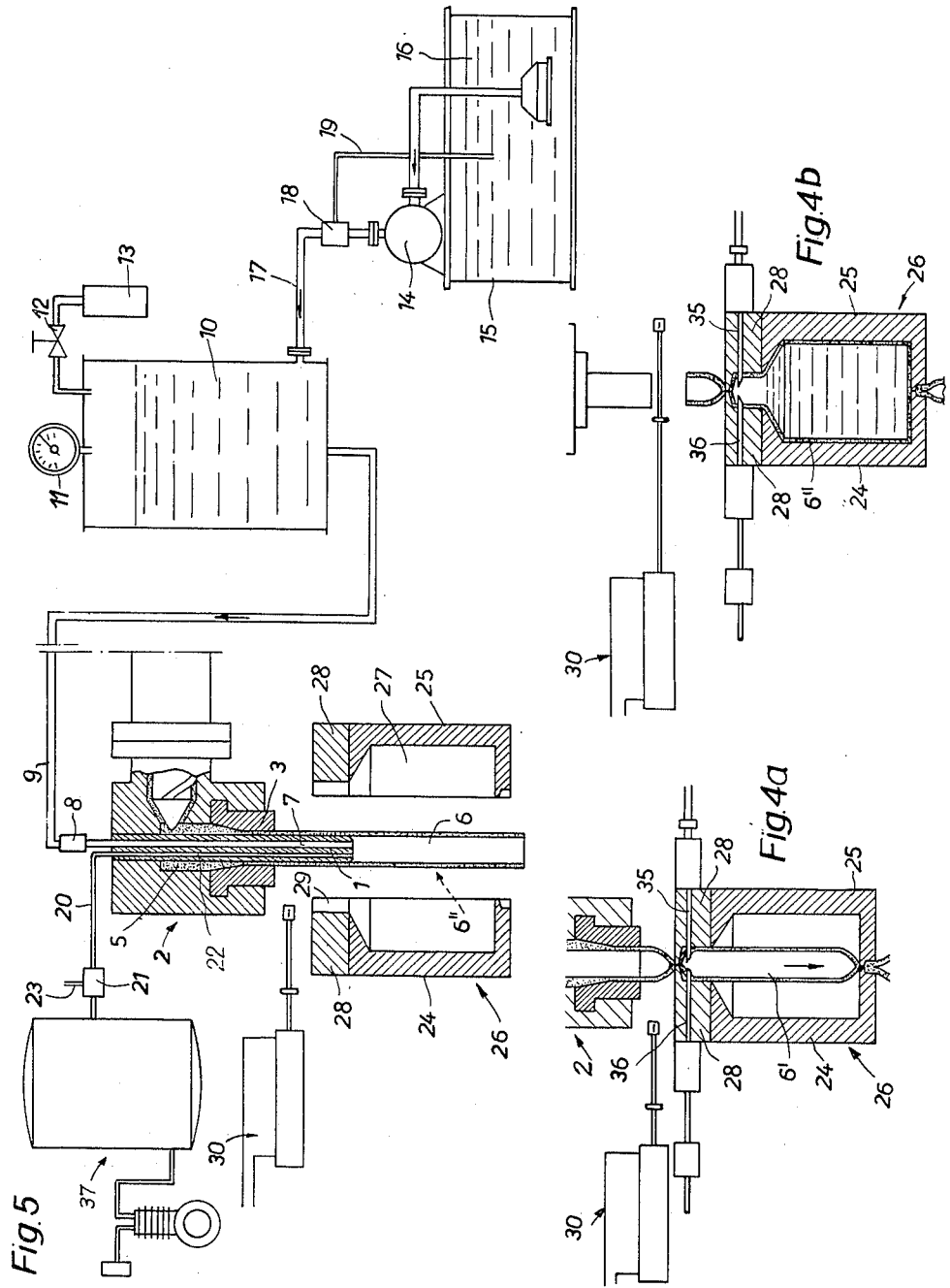

United States Patent Office 3,251,915
Patented May 17, 1966

3,251,915
METHOD AND APPARATUS FOR MANUFACTURING CLOSED CONTAINERS FILLED WITH FLOWABLE GOODS
Heinz Pechthold, Mudau, Odenwald, Germany, assignor to Etablissement Bonatex, Vaduz, Liechtenstein
Filed Oct. 24, 1962, Ser. No. 232,681
Claims priority, application Switzerland, Oct. 25, 1961, 12,367/61
12 Claims. (Cl. 264—94)

This invention relates to a method of manufacturing a closed container filled with flowable goods, e.g. with a liquid, from a hollow body of thermoplastic material which is enclosed in a mold and which is in a moldable state so that it can be expanded to fit said mold and assume a predetermined shape.

It is known to blow up such a hollow body of thermoplastic material enclosed in a mold while in a moldable state, by means of compressed air introduced into the hollow body so as to expand it into the shape of a container. Such containers are only filled after their completion, and often additional storing space is required for maintaining a supply of empty containers; frequently it is unavoidable, in addition to troublesome filling operations which require costly equipment, to have them preceded by a separate cleaning operation.

To avoid these inconveniences, it has already been proposed to combine into a single process the formation of the container and its filling with the flowable goods. Thus, it has become known to expand a pre-shaped thermoplastic mass, which is applied to the end of a filling tube for the flowable goods, in a closed mold by means of these very flowable goods. However, it is possible in this manner to produce only comparatively small containers such as ampoules; it would not be practicable to place the required large mass of thermoplastic material in the shape of a bulb, whether pre-formed or not, around the end of the filling tube, and then to expand it so as to obtain a spacious container having uniform and comparatively strong walls. At the best it would be possible, and this has already been suggested, to bring a bulb of suitable material placed around the end of a filling tube into the shape of a very thin-walled, bag-like article by merely applying thereto the flowable goods it is to contain. This operation would be somewhat comparable to the blowing of soap bubbles. A rigid vessel which would serve as the manufacturing place of such a bubble filled with the flowable goods could not be dispensed with. Obviously, realization of the above-mentioned suggestions, application of which would nevertheless be very limited, would require extremely complicated equipment.

It has also been proposed to fill the flowable goods directly into an extruded tube through an axial duct in the core of an extruding die, whereby the tube is expanded and thereafter is subdivided into sections by transverse welded seams. Thereby, small bag-like sections of limited contents are formed. However, the manufacture of more capacious containers is not feasible by this method.

In brief, the suggestions hitherto made for forming a container and filling it with flowable goods in one and the same operation have been applicable only for small, thin-walled ampoules or bag-like containers but not for larger containers which cannot be obtained from a small, pre-formed or unformed bulb-like mass of material, but can only be produced by expanding a hollow body due to the comparatively large space they are to have.

The main object of the present invention is to provide a method which permits combining the molding process with the filling process into a single operation even though the containers are to be voluminous.

Another object of the invention is to provide apparatus for carrying out this method.

Further objects and advantages of the invention will become apparent from the description to follow of a few embodiments thereof given by way of example only, and in which reference will be had to the accompanying drawings in which:

FIG. 1 schematically represents a first example of apparatus for carrying out the method of the invention, which apparatus comprises an extruding press for producing a tube, and a mold in which the tube thus produced is maintained to form a hollow body;

FIG. 1a represents part of the apparatus of FIG. 1 with the expanded hollow body in the final stage of the filling and molding operation;

FIG. 1b represents the mold with the container thus formed and filled, as it is severed from the continuous extruded tube;

FIG. 1c represents the mold in an initial stage of the sealing step;

FIG. 1d shows the mold with the filled container as the latter is being sealed;

FIG. 1e represents the mold after its opening for removal of the filled and sealed container;

FIG. 2a illustrates a modification of the apparatus shown in FIG. 1, in the same operational position as the latter;

FIG. 2b shows the apparatus of FIG. 2a while in an operational position corresponding to that of FIG. 1b;

FIG. 4 represents a further modification of the apparatus according to FIG. 1, in the same operational position as the latter with the mold still open;

FIG. 4a represents part of the modified apparatus of FIG. 4 with the mold closed preparatory to the filling and expanding operation;

FIG. 4b represents the same part of the apparatus of FIG. 4 with the container formed and filled, as it is severed from the extruded tube; and FIG. 5 illustrates a further modification of the apparatus of FIG. 1, in the same operational position as the latter with the mold still open.

Figure 3A:
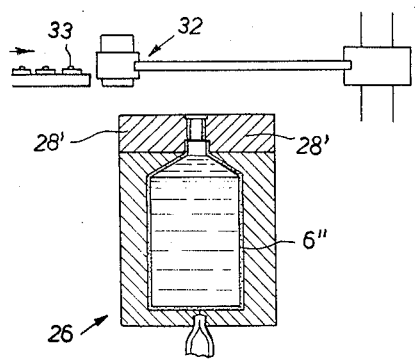
FIG. 3a represents a further modification of the apparatus of FIG. 1, in which provision is made for closing the container by means of a screw cap.

According to FIG. 1, in the extrusion die 3 of an extrusion press generally designated by 2, a core 1 defines a passage 4 of annular cross-section, through which themoplastic material 5 is extruded into the shape of a tube 6. A longitudinal duct 7 in the core 1, which is heated by suitable means before the extrusion, connected through a non-return valve 8 and a conduit 9 to a pressure vessel 10. This is equipped with a pressure gauge 11 and is connected with a pressure accumulator 13 through a shut-off valve 12. By means of a pressure pump 14, the pressure vessel 10 is supplied from a reservoir 15 with a liquid 16 which is to be filled into containers. In the delivery conduit 17 of the pump 14, an adjustable pressure-regulating overflow valve 18 is mounted in known manner, with a by-pass conduit 19 returning to the reservoir 16. A return conduit 20 which is connected by an adjustable throttle valve 21 to another another longitudinal duct 22 in the core 1 also joins the by-pass conduit 19. A venting pipe 23 starts from the throttle valve 21.

The halves 24 and 25 of a mold 26 are movably supported and mutually guided by means not shown in the drawing, in such a manner that on closing of the mold, the extruded tube section 6 becomes trapped in the mold space 27. While the mold closes, the lower end of the tube section is closed as shown, among others, in FIG. 1a and heat-sealed by the bottoms of the mold halves which are heated in a suitable manner. The two mold halves 24 and 25 are provided each with a closing jaw 28 having a semi-cylindrical recess 29. The arrangement is such that when the mold is closed (see FIG. 1a and others) the closing jaws 28 joint around the extruded tube 6 in the region of the end portion of the core 1.

From the above it will be understood that after the closing of the mold 26 a hollow body, namely, the end portion of the extruded tube 6 which has been seized between the two mold halves 24 and 25, is enclosed in the mold space 26; the space inside such hollow body (designated 6' to distinguish it from the open end portion of the extruded tube 6) is connected by the duct 7 to the supply conduit 9 and by the duct 22 to the return conduit 20 and the venting pipe 23. The hollow body 6' is still hot enough to be blown into the shape of the mold space 27. For this purpose, liquid 16 is introduced into the hollow body 6' from the pressure vessel through the conduit 9 and the duct 7 under high pressure which is obtained by opening the shut-off valve 12 of the pressure accumulator 13 filled with compressed air or another compressed gas. The air trapped in the hollow body 6' is permitted to escape through the throttle valve 21 and the venting pipe 23. Thus, the hollow body 6' is molded into a container 6'' (see FIG. 1a). It will be understood that the molding pressure depends on the adjustment of the throttle valve 21. The molding and filling process, an advanced stage of which is illustrated in FIG. 1a, is terminated as a rule when the liquid reaches the mouth of the escape duct 22 and flows back through the return conduit 20. Since the container 6'' thus formed is completely vented for all practical purposes, there is no objection to connecting its inside to the atmosphere. In particular, after retraction of the core 1 to a position above the jaws 28, the container 6'' can then be severed from the extruded pipe by means of a cutting device 30, as shown symbolically in FIG. 1b.

While the mold 26 is still closed, the jaws 28 are retracted as shown in FIG. 1c, so that closing jaws 31 supported and guided in a manner not shown can be applied. These are pressed together as shown in FIG. 1d whereby the throat of the container 6'' which up to then still is maintained warm by the heated core 1 is closed and sealed. Thereupon, the mold 26 can be opened the filled and sealed container 6'' can be removed as shown in FIG. 1e.

Since the air trapped in the hollow body 6' is allowed to escape against a back-pressure, the molding process begins as soon as the liquid to be filled in starts flowing into the hollow body. Although the liquid is introduced into this body at a very high speed to avoid cooling of the latter down to a temperature which would no longer permit its molding, the molding pressure reaches its peak only gradually, without a shock, so that in spite of the high speed the molding occurs smoothly and without damage to the thermoplastic material. Due to this fact, molding speeds can be used which otherwise would have been unattainable since they would have led to destruction of the hollow body to be molded. This would occur, for instance, if the air were allowed to escape without back-pressure, because deformation of the material then would start briskly only after the hollow body will have been entirely filled with the liquid, and after substantial cooling will have occurred. With the described method, the deformation of the thermoplastic material and the filling are completed about at the same time, and the removal of heat by the liquid, since it does not start too soon, is advantageous rather than detrimental.

Although in the described embodiment the return conduit 20 is connected to the reservoir 15, which is preferable, this is not essential for carrying out the invention. In fact, it would be possible to permit the air to escape into the atmosphere while of course maintaining a back-pressure on it, and simultaneously to fill in a measured amount of liquid into the hollow body 6' so that no excess liquid would have to be removed through the duct 22. In this case, and especially if the container must not be completely filled, some proper measures would have to be taken before opening the mold for expanding any air which has remained trapped.

Another advantage results from the fact that the container is removed from the mold only after it has been sealed. This makes it unnecessary to use the particular care required in the handling of filled but not sealed plastic containers.

Figure 3B:
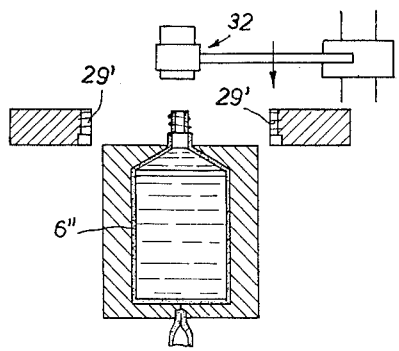
FIG. 3b represents the mold, in the modification according to FIG. 3a, in the initial stage of the closing operation.
Figure 3C:
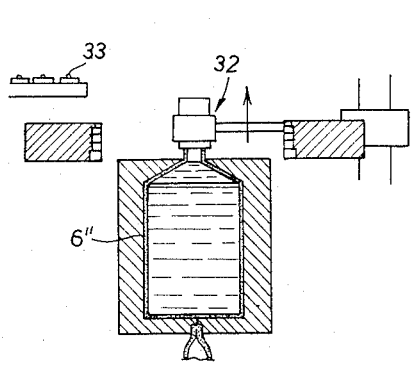
FIG. 3c shows the mold of the modification of FIG. 3a with the filled container as the latter is being closed.
Figure 3D:
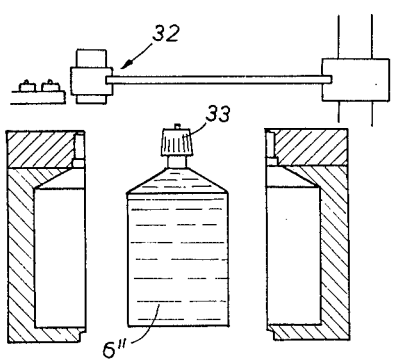
FIG. 3d shows the mold of the modification of FIG. 3a after its opening for removal of the filled and sealed container.

The closing of the container can be effected in other manners than by sealing its bottom and its neck. In this connection, FIGS. 3a to 3d, are pertinent. Therein the semi-cylindrical recesses are indicated by 29' of the mold jaws, which are designated by 28'. The recesses 29' are so shaped that they will produce a screw thread on that portion of the extruded tube which is to form the neck of the container 6''. By means of a closing device 32, closure caps 33 may be placed on the neck of the container 6'' as soon as the jaws 29' have moved apart and any flash formed at the joint between the jaws 29' has been removed from the container neck.

According to FIGS. 2a and 2b, in which similar parts have been given the same reference numerals as in FIG. 1, the core, here designated by 1', of the extrusion press 2 has no longitudinal ducts. There is a second core 34 which is introduced from below into the end of the extruded tube 6. The core 34 is provided with a duct 7 by which a supply conduit 9 may be connected to the inside of the extruded tube 6, and with a duct 22 by which a return conduit 20 may be similarly connected. The supply conduit 9 is provided with a non-return valve 8 and the return conduit 20 with a throttle valve 21. As in the example of FIG. 1, the conduits 9 and 20 are connected to the pressure vessel 10 and to the reservoir 15, respectively; the modifications indicated in connection with the first example are similarly applicable. The molding and filling operation is effected as described in connection with FIGS. 1a to 1e and as illustrated by FIGS. 2a and 2b, whereupon the container 6'' can be sealed and removed from the mold.

The arrangement of FIG. 4 basically corresponds to that of FIG. 1, and the same reference numerals are retained for the similar parts so that it will suffice hereinafter to point out the differences. In this example, the supply conduit 9 and the return conduit 20 are connected each to one hollow needle 35 and 36, respectively. The hollow needles 35 and 36 are slidably guided each in one of the jaws 28, an advancing and retracting device 29 being provided for each, for advancing the needles towards each other and away from each other. As represented in FIG. 4a, the end portion of the extruded tube 6 is squeezed by the mold halves 24 and 25 and by the two jaws 28 at two spaced points and thereby it is sealed at both ends. Thereupon, the two hollow needles 35 and 36 are advanced (see FIG. 4a) until they perforate the wall of the hollow body 6' enclosed in the mold 26, whereby the conduits 9 and 20 are connected to the inside of the body 6'. By rapidly injecting the liquid into the hollow body 6', the latter is molded into a container 6'' (see FIG. 4b), whereupon the hollow needles 35 and 36 are retracted and the container is closed in suitable manner.

According to FIG. 5, a compressed air supply assembly 37 is connected to the return conduit 20 through the throttle valve unit 21; otherwise, the apparatus comprises the parts already described with reference to FIG. 1. The air supply group 37 serves to supply compressed air at moderate pressure for pre-blowing the hollow body 6' and thereby influence the characteristics of the molding process. The removal of the air subsequently displaced in filling the hollow body with liquid again occurs through the duct 22 and the conduit 20 against the back-pressure set up by the throttle valve in the unit 21. In this example, it is possible to connect the air venting pipe 23 to the reservoir 15 and to construct the throttle valve unit 21 in such a manner that it acts as a non-return valve for preventing the air supply assembly 37 from delivering compressed air towards the conduit 20 while air is being displaced through the latter from the hollow body by the liquid. However, a separate non-return valve may be provided for that purpose. Further, care must be taken that the compressed air from the supply assembly 37 can flow only into the hollow body through the conduit 20 but does not escape through the venting pipe 23. For that purpose, the throttle valve unit 21 should be constructed as a pressure-responsive switching valve controlling the various connections. The modifications of the apparatus and of the molding and filling process which have been suggested in connection with FIG. 1 also are applicable to the present embodiment.

What is claimed is:

1. A method of manufacturing a closed container filled with flowable goods, which comprises the steps of heating thermoplastic material to render it moldable, forming a hollow body therefrom, placing said hollow body within a mold while still in moldable state, introducing flowable goods into said hollow body while the latter still is in moldable state, whereby air in said body is displaced therefrom, and simultaneously allowing said displaced air and any excess flowable goods to escape from said hollow body while exerting a back-pressure thereon to maintain a substantially higher than atmospheric pressure within said hollow body, whereby the latter both is gradually expanded to fit said mold and thus assume a predetermined shape, while being filled with said flowable goods, thereafter closing said expanded and filled hollow body, and removing it from said mold.

2. The method as claimed in claim 1 wherein the step of introducing flowable goods into said hollow body and allowing any excess of such flowable goods to escape from said hollow body comprises circulating said flowable goods through the inside of said hollow body while restricting the flow thereof downstream of such hollow body.

3. Apparatus for manufacturing closed containers filled with flowable goods, said apparatus comprising mold means enclosing a molding space and adapted for retaining therein a pre-shaped hollow body, said mold means providing a supply duct to said molding space adapted for communicating with said hollow body and a return duct from said molding space adapted for communicating with said hollow body, a supply conduit connected to said supply duct, a return conduit connected to said return duct, means for feeding flowable goods through said supply conduit and duct for filling said hollow body, and adjustable throttling means in said return conduit for restricting the flow of air and of any of said flowable goods therethrough to cause increase of pressure of the flowable goods in the hollow body which deforms the hollow body and causes the same to assume the shape of the molding space.

4. Apparatus as claimed in claim 3 and further comprising a reservoir for flowable goods, said means for feeding flowable goods being connected to said reservoir for drawing said goods therefrom, and said return conduit being connected to said reservoir for delivering thereto, excess flowable goods which has been introduced into the body.

5. Apparatus as claimed in claim 3 and further comprising a pressure accumulator connectable to said supply conduit.

6. Apparatus as claimed in claim 3 in which said means for feeding flowable goods comprises a feeding pump, said apparatus further comprising a pressure vessel connected to said supply conduit and a pressure accumulator connectable to said pressure vessel.

7. Apparatus as claimed in claim 3 and further comprising a source of compressed air, means connecting said source of compressed air to said supply duct, and a non-return valve mounted in said connecting means.

8. Apparatus as claimed in claim 7 and further comprising a control unit mounted in said connecting means and between said return duct and return conduit, said control unit comprising pressure-responsive valve means for presenting the air supplied by the said source of compressed air from flowing to said return conduit and the air arriving through the said return duct from flowing to said source of compressed air.

9. A method of manufacturing a closed container filled with a fluid medium, said method comprising heating thermoplastic material to render the same moldable, forming a hollow body from said material, placing said hollow body within a mold while still in moldable state, introducing a fluid medium into said hollow body while the latter is still in moldable state to expel air in said body therefrom, exerting a back pressure on the air to maintain a substantially higher than atmospheric pressure within said body as the latter is being filled whereby the body is gradually expanded to conform to the shape of the mold while being concurrently filled with said fluid medium, and thereafter closing the thus expanded and filled hollow body and removing the same from the mold.

10. The method as claimed in claim 9 and comprising the further step of increasing the pressure of the air within the said hollow body preparatory to the introduction of the fluid medium thereinto.

11. A method of manufacturing a closed container filled with a fluid medium, said method comprising inserting heated thermoplastic material in the form of a hollow body into a mold, introducing a fluid medium into the hollow body while adjustably throttling the outflow of air located within said body to establish a pressure substantially higher than atmospheric pressure within said body to cause the body to be expanded to conform to the shape of the mold while being filled with said fluid medium, and thereafter closing the thus filled and expanded body and removing the same from the mold.

12. Apparatus for manufacturing closed containers filled with flowable material, said apparatus comprising mold means defining a molding space, means for introducing a moldable hollow body into said space, means associated with said mold means for introducing flowable material into the hollow body with the latter in said space in the mold means, means in association with said body for the outflow of air therefrom as the body is being filled with flowable material, the latter means including means for adjustably throttling the outflow of air to cause a pressure greater than that of atmospheric pressure to be developed in the body as the same is being filled with flowable material whereby the body will be expanded to conform to the shape of the mold while the body is being filled with material and air in the body is being expelled, the apparatus further comprising means for closing the body with the latter still in the mold to permit the body closed and filled to be removed from the mold.

References Cited by the Examiner

UNITED STATES PATENTS 2,315,478   3/1943   Parkhurst _____ 264—94
2,958,171   11/1960  Deckers _____ 53—140
3,127,458   3/1964   Scott et al. _____ 264—98

FRANK E. BAILEY, *Primary Examiner.*

TRAVIS S. McGEHEE, *Examiner.*

A. E. FOURNIER, *Assistant Examiner.*